(12) United States Patent
Salem et al.

(10) Patent No.: US 11,989,552 B2
(45) Date of Patent: May 21, 2024

(54) AUTOMATED QUALITY ASSESSMENT OF A PROGRAMMING TASK

(71) Applicant: Altooro Technologies LTD., Haifa (IL)

(72) Inventors: Wasim Abu Salem, Haifa (IL); Mohammad Mitwaly, Nazareth (IL)

(73) Assignee: ALTOORO TECHNOLOGIES LTD., Haifa (IL)

(*) Notice: Subject to any disclaimer, the term of this patent is extended or adjusted under 35 U.S.C. 154(b) by 0 days.

(21) Appl. No.: 17/664,221

(22) Filed: May 19, 2022

(65) Prior Publication Data

US 2023/0376311 A1   Nov. 23, 2023

(51) Int. Cl.
*G06F 8/77* (2018.01)

(52) U.S. Cl.
CPC ................................. *G06F 8/77* (2013.01)

(58) Field of Classification Search
None
See application file for complete search history.

(56) References Cited

U.S. PATENT DOCUMENTS

| | | | | |
|---|---|---|---|---|
| 7,478,367 B2* | 1/2009 | Morgan | ..... | G06F 8/51 717/124 |
| 8,856,725 B1* | 10/2014 | Anderson | ..... | G06F 8/75 717/103 |
| 9,652,225 B1* | 5/2017 | Bohn | ..... | G06F 11/362 |
| 9,727,736 B1* | 8/2017 | McClintock | ..... | G06F 11/3604 |
| 11,650,903 B2* | 5/2023 | Sloyan | ..... | G06F 11/3612 717/124 |
| 2005/0160395 A1* | 7/2005 | Hughes | ..... | G06Q 10/10 717/102 |
| 2010/0077375 A1* | 3/2010 | Millmore | ..... | G06F 8/20 717/101 |
| 2010/0262471 A1* | 10/2010 | Hughes | ..... | G06Q 10/101 705/7.29 |
| 2012/0331439 A1* | 12/2012 | Zimmermann | ..... | G06F 8/77 717/101 |
| 2017/0235569 A1* | 8/2017 | Sturtevant | ..... | G06Q 10/06393 717/102 |
| 2017/0293546 A1* | 10/2017 | Frontiero | ..... | G06F 11/302 |
| 2018/0232296 A1* | 8/2018 | Klein | ..... | G06F 11/3608 |
| 2018/0276584 A1* | 9/2018 | Woulfe | ..... | G06Q 10/0635 |
| 2019/0050814 A1* | 2/2019 | Surkov | ..... | G06F 21/6254 |

(Continued)

OTHER PUBLICATIONS

M. C. da Silva, A. A. J. Cizotto and E. C. Paraiso, "A Developer Recommendation Method Based on Code Quality," 2020 International Joint Conference on Neural Networks (IJCNN), Glasgow, UK, 2020, pp. 1-8. (Year: 2020).*

(Continued)

*Primary Examiner* — Andrew M. Lyons

(57) ABSTRACT

A method, system and product for automated quality assessment of a programming task. Programming activity of a developer is monitored to obtain measurements of a plurality of metrics in a plurality of time segments. Functional correctness of the program at a last time segment of the plurality of time segments is determined. Based on the measurements of each of the metrics in the plurality of time segments, a plurality of features are computed. The plurality of features are indicative of a behavior of the developer while programming. A prediction model is utilized to provide an automated assessment based on the values of the plurality of features.

14 Claims, 6 Drawing Sheets

(56) References Cited

U.S. PATENT DOCUMENTS

| | | | | |
|---|---|---|---|---|
| 2020/0364345 | A1* | 11/2020 | Hecht | G06F 21/577 |
| 2021/0109750 | A1* | 4/2021 | Malde | G06F 11/302 |
| 2021/0182767 | A1* | 6/2021 | Tibrewala | G06Q 10/063114 |
| 2021/0233029 | A1* | 7/2021 | Mittal | G06Q 10/1053 |
| 2023/0230039 | A1* | 7/2023 | Winler | G09B 7/00 |
| | | | | 705/321 |
| 2023/0368696 | A1* | 11/2023 | Lee | G06F 8/77 |

OTHER PUBLICATIONS

R. Nabil, N. E. Mohamed, A. Mahdy, K. Nader, S. Essam and E. Eliwa, "EvalSeer: An Intelligent Gamified System for Programming Assignments Assessment," 2021 International Mobile, Intelligent, and Ubiquitous Computing Conference (MIUCC), Cairo, Egypt, 2021, pp. 235-242. (Year: 2021).*

* cited by examiner

AUTOMATED QUALITY ASSESSMENT OF A PROGRAMMING TASK

TECHNICAL FIELD

The present disclosure relates to quality assessment in general, and to automated quality assessment of a programing task, in particular.

BACKGROUND

Programming tasks often require specific skillset. On top of the knowledge of the syntax of the relevant programming language, the task may require the programmer, also referred to as a developer, to plan ahead, consider multiple options and corner cases, as well handle computational and memory complexity issues. In many cases, there is no single correct answer, and not even a single correct general flow of the answer. Instead, many different answers may be acceptable and may indicate knowledge of the relevant domain.

Plagiarism is often a concern when a programming task is given as part of the recruiting process. There are many tools attempting to identify whether a program is in fact derived from another program. The most notable of these is a syntactical diff tool, which identifies for each line in two compared products, whether they are identical, new, deleted, or the like. There are also tools that can identify semantically identity even when syntactical difference exist, such as different variable names, or even different programming constructs (e.g., replacing "for" loop with a "while" loop, removing recursive functions and replacing them by non-recursive functions with identical functionality).

BRIEF SUMMARY

One exemplary embodiment of the disclosed subject matter is a method comprising: automatically monitoring a developer while the developer is programming a program via a development environment, wherein said monitoring comprises periodically obtaining measurements of a plurality of metrics, whereby obtaining the measurements in a plurality of time segments; automatically determining a functional correctness of the program at a last time segment of the plurality of time segments; computing values of a plurality of features based on the measurements of each of the metrics in the plurality of time segments, the plurality of features are indicative of a behavior of the developer while programming; and utilizing a prediction model to provide an automated assessment based on the values of the plurality of features.

Another exemplary embodiment of the disclosed subject matter is a system comprising: a processor and a memory, wherein said system is configured to obtain from a monitoring module measurements of a plurality of metrics in a plurality of time segments, the monitoring module is configured to automatically monitor a developer while the developer is programming a program via a development environment; wherein said system is configured to validate, using a functional correctness module, a functional correctness of the program at a last time segment of the plurality of time segments; wherein said processor is configured to: compute values of a plurality of features based on the measurements of each of the metrics in the plurality of time segments, the plurality of features are indicative of a behavior of the developer while programming; and utilize a prediction model to provide an automated assessment based on the values of the plurality of features.

Yet another exemplary embodiment of the disclosed subject matter is a non-transitory computer readable medium retaining program instructions, which program instructions when read by a processor, cause the processor to perform: automatically monitoring a developer while the developer is programming a program via a development environment, wherein said monitoring comprises periodically obtaining measurements of a plurality of metrics, whereby obtaining the measurements in a plurality of time segments; automatically determining a functional correctness of the program at a last time segment of the plurality of time segments; computing values of a plurality of features based on the measurements of each of the metrics in the plurality of time segments, the plurality of features are indicative of a behavior of the developer while programming; and utilizing a prediction model to provide an automated assessment based on the values of the plurality of features.

Optionally, the plurality of metrics comprise at least one of: a metric comparing a version of the program at an end of each time segment with correct programs, the correct programs achieve a same functional goal as the program when the program is determined to be functionally correct; a metric indicating whether the developer was programming during each time segment; a metric measuring an amount of text that was typed by the developer during each time segment; and a metric relating to a length of the program at the end of each time segment.

Optionally, the plurality of features comprise at least one of: a feature indicating logic stability of the program over the plurality of time segments; a feature indicating debugging time performed by the developer; a feature indicating a variance in a rate of is programming performed by the developer over the plurality of time segments; and a feature indicating a thinking time duration taken by the developer to plan how to develop the program.

Optionally, the prediction model is further configured to provide the automated assessment based on one or more features derived based on a self-reported profile of the developer obtained from one or more social networks.

Optionally, the prediction model is further configured to provide the automated assessment based on one or more features derived from activity of the developer as reflected on a code repository.

Optionally, the code repository comprises a version control functionality, wherein at least one feature is derived based on code commits performed by the developer using the version control functionality.

Optionally, the program is a programming task provided as part of a recruiting process of the developer.

Optionally, said automatically determining the functional correctness of the program comprises: executing a plurality of unit tests, wherein in response to successful execution of each of the plurality of unit tests, the functional correctness of the program is determined.

Optionally, said monitoring module is executed by an Integrated Development Environment (IDE) used by the developer and constituting the development environment.

Optionally, the prediction model is implemented using at least one of a machine learning model and a deep learning model.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
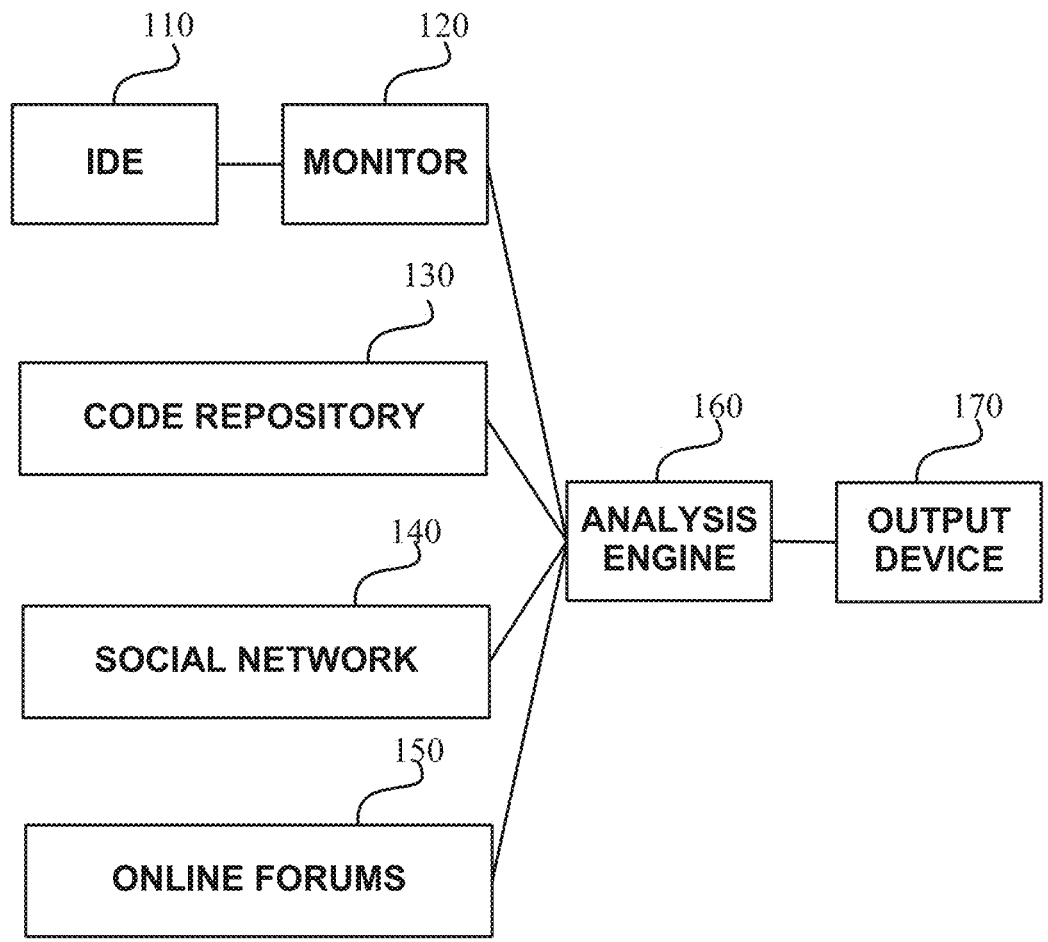
FIG. 1 shows a schematic illustration of an exemplary environment and architecture in which the disclosed subject matter may be utilized, in accordance with some exemplary embodiments of the disclosed subject matter.

One technical problem dealt with by the disclosed subject matter is to automatically assess the quality of a performance of a developer of a programming task. In many cases, different solutions to the same programming task may be acceptable. However, it may be desired to assess the quality of the developer's work. It may be desired to provide a score for each developer indicating the developer's competence and ability. As one example, during a recruiting process, it may be desired to evaluate a candidate's performance and assess her capabilities. As another example, it may be desired to evaluate the progress of new recruits through training journeys. As yet another example, assessment of developer's performance during development may be desired. Such assessment may be useful to better analyze the strengths and weaknesses of a specific developer, a team, or the like. The assessment may also be used when performing periodic evaluations, discussing bonuses and salary changes.

It is noted that assessing other tasks, not necessarily related to development may is also be desired. For example, assessing how well a student solves a mathematical question, how well an employee performs a modeling task using formal language, or the like. The disclosed subject matter may be applicable to such tasks as well and is not limited to development and programming tasks.

Another technical problem dealt with by the disclosed subject matter relates to inferring the proficiency of a developer based on his declared set of skills. In many cases, developers may declare that they have a specific skill. For example, a CV of a developer may indicate that the developer is proficient in programming in Java™. As another example, a profile of the developer on LinkedIn™ may indicate that the developer is skill with respect to "Design Patterns". Such declarations may not necessarily be true, and it may be desired to assess whether such skills do exist.

One technical solution provided by the disclosed subject matter may be to monitor the developer's activity while performing a development task, and assess his capabilities based on his monitored activity. It is noted that a naïve solution may consider the final product provided by the developer. However, the disclosed subject matter suggests to monitor incomplete versions of the product, also referred to as incomplete solutions. In some exemplary embodiments, a monitoring agent may be implemented in a development environment, such as an Integrated Development Environment (IDE), command-line based development environment, or the like. The monitoring agent may be part of the development environment (e.g., a functionality implemented in the IDE), or external thereto (e.g., a browser extension executed by a browser that is used to execute a web-based development environment). The monitoring agent may be configured to periodically capture, measure or otherwise obtain measurement of one or more metrics, thereby obtaining a time series valuations of each of the one or more metrics relating to a plurality of time segments. For example, the monitoring agent may capture metrics measurements every 10 seconds, every minute, every 5 minutes, every 15 minutes, every hour, or the like. In some exemplary embodiments, the time segments may have a predetermined uniform duration.

In some exemplary embodiments, various metrics may be utilized. In some exemplary embodiments, one metric may be indicative of a change of the versions of the incomplete solution over time. Another metric may be indicative of a similarity of the is incomplete solution to known correct solutions, which may be a-priori known, or determined in retrospect after obtaining a plurality of solutions from a plurality of developers. Yet another metrics may relate to the typing rate during the time segment, to the length of the incomplete program, to whether or not the developer had utilized the time segment to program, to computational complexity of the incomplete solution, to similarity measurement of the incomplete solution, to compile errors existing in the incomplete solution, to text relating to prototype of functions in the incomplete solution, to text relating to prototypes of functional not mandated by the programming task, to number of times the program was executed during the time segment, a number of times the user has compiled the program during the time segment, or the like.

In some exemplary embodiments, functional correctness of the solution may be verified. In some exemplary embodiments, the functional correctness may be verified by executing the program using specific inputs and verifying that the output is as expected. Additionally or alternatively, functional correctness may be verified by executing unit tests. A test harness may be utilized to execute the unit tests and ensure that the program provides a correct solution. In some exemplary embodiments, the unit test may be provided by the entity providing the programming task. Additionally or alternatively, functional correctness may be determined based on executing other solutions that are known to be correct, and comparing the output provided by the other solutions with that provided by the program.

In some exemplary embodiments, based on the measured metrics, values of one or more features may be computed. In some exemplary embodiments, the features may be based variance, average value, standard deviation, complexity-invariant distance, complexity value, number of peaks, number of shallow regions, signal to noise ratio, or the like. In some exemplary embodiments, the feature may be indicative of how the developer has performed her programming task. For example, the features may be indicate the time the programmer has invested in thinking and the time invested in coding. As another example, the features may indicate programming time vs. debugging time. As yet another example, the features may indicate whether the number of continuous coding sessions performed by the programmer, the number of times she got "stuck", how close she was to her final solution during her programming and whether she was consistent in her solution concept. Additional indications regarding the behavior of the programmer may be extracted using the measurements.

In some exemplary embodiments, a prediction model may be applied on the values of the features to provide an automated assessment of the programmer. In some exemplary embodiments, the prediction model may be implemented using machine learning, deep learning, clustering, or the like. In some exemplary embodiments, the prediction model may further be based on features derived from source code repositories, from social networks, from a Curriculum Vitae (CV) of the programmer, or the like.

In some exemplary embodiments, a self-reported profile, such as LinkedIn™ profile of the developer or similar profile in a social network, CV, or the like, may be obtained. The self-reported profile may be used to collect information about the area of socialization of the developer. Additionally or alternatively, the self-reported profile may be used to collect information about self-reported abilities and skills of the developer.

In some exemplary embodiments, information from code repositories may be extracted. For example, information about the developer's handle in GitHub™ or similar code repository may be obtained to identify commit activities the developer has performed. In some exemplary embodiments, the code repository may be a Q&A repository, such as StackOverflow™ in which developers may ask questions and receive answers. Information from the code repositories may be utilized to identify skills and abilities of the developer, as well as her accomplishments. Additionally or alternatively, the content of the commit may be analyzed, the issues and bugs identified in code associated with the developer may be identified, the developer's reputation on the platform may be identified, or the like.

In some cases, code plagiarism and attempts to skew the analysis in favor of the developer in a non-authentic manner may be identified, and their effects may be mitigated. For example, the reputation and content of repositories in which the developer takes part, may be assessed. In some cases, repositories with a small number of contributors may be disregarded. Additionally or alternatively, repositories that appear to be mostly a copy of other well-known repositories may be disregarded. As another example, repositories that are associated with open code initiatives and in which there's a large number of contributors, may be given more weight in the assessment process than other repositories with fewer contributors or with a less flexible hierarchy (e.g., proprietary code owned and developed by a specific organization).

One technical effect of utilizing the disclosed subject matter may be to automate resource-intensive aspects of developer's evaluation, recruiting, on-boarding, training, or the like. In some exemplary embodiments, the disclosed subject matter may enable to automatically assess the product of the developer based on the development process, reflecting her thought process.

Another technical effect may be to mitigate the ability of developers to cheat and rely on other people's code or assistance. Plagiarism may be identified, directly or indirectly, based on the actual development process that is being monitored. In addition, the developer's reputation in relevant communities may be taken into account, reducing the ability of a malicious actor to present herself as having abilities she does not have.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1 showing an illustration of a computerized environment, in accordance with the disclosed subject matter.

A user may utilize an IDE 110 to develop code. In some cases, IDE 110 may be web-based system in which programming tasks are being performed. Additionally or alternatively, IDE 110 may be a desktop application or implemented in any other manner. In some exemplary embodiments, the programming task may be a programming task given to candidates as part of recruiting and evaluation process. Additionally or alternatively, the programming task may be given as part of an onboarding process for new developers. Additionally or alternatively, the programming task may be given to students during their studies in which they are taught new techniques, technologies, or the like. In some exemplary embodiments, the programming task may be any coding exercise or even coding task to be utilized in a real product.

A Monitor 120 may be configured to monitor the activity of the users in the IDE 110. In some exemplary embodiments, Monitor 120 may obtain a time-series data collection relating to the user's activity during performance of the programming task. In some exemplary embodiments, the time-series data collection may comprise periodic measurements of a plurality of metrics. Monitor 120 may be configured to track information and determine a measurement for each metric during each time segment. For example, the measurements may be computed for 5 seconds intervals, 10 seconds intervals, 20 seconds intervals, 30 seconds intervals, 1 minute intervals, 10 minutes intervals, or the like.

Any metric may be measured and computed. Without loss of generality, the disclosed subject matter may relate to any one or combination of the following metrics.

Characters Per Increment (CPI): The amount of characters written by a user in a specific time segments. In some exemplary embodiments, CPI at time segment n (CPI[n]) may be defined during time segment n.

Length Per Increment (LPI): a measurement indicating the user's code length that was added to the program during the time segment. For example, the size of the code may be computed at each time segment (e.g., at the end of the time segment). As opposed to CPI, LPI may indicate the amount of total characters/length of the program at the time segment, and not just the amount that was added. In some exemplary embodiments, LPI at time segment n can be defined as LPI[n]=len(CodeState[n]), where CodeState[n] is the state of the intermediate solution at time segment n. In some cases, LPI[n+1]=LPI[n]+CPI[n+1], where n is a time segment. However, it may not necessarily be the case, as the user may delete characters and write additional characters instead. In such cases, the LPI may even remain unchanged, while the CPI is positive.

Focus Per Increment (FPI): a Boolean value indicating whether the user was focused on coding the programming task during the time segment. In some cases, the FPI may be determined based on whether the user is active in the IDE 110. For example, IDE 110 may be executed within a web browser. If the user has left the browser and was active on another program, or left the tab in which IDE 110 is being executed, it may be determined that the user was not focused in the time segment. In some exemplary embodiments, the FPI may indicate whether the user was programming during the time segment.

In some exemplary embodiments, FPI may be a binary signal where the value 1 indicates that the user solving the question is currently present in the IDE 110 tab and 0 indicates that the user is located in a different tab or application, presumably using resources outside of the platform. In some exemplary embodiments, the FPI signal at time segment n can be defined as:

$$FPI[n] = \begin{cases} 1, & \text{if user on } \textit{Altooro IDE} \\ 0, & \text{user outside } \textit{Altooro IDE} \end{cases}.$$

Distance Per Increment (DPI): a measurement indicating of similarity of the intermediate solution the user has during the time segment (e.g., at the end of the time segment) to a set of known correct solutions. In some exemplary embodiments, during each time segment, a snapshot of the intermediate solution is taken and compared to a repository of known solutions to the programming task. It's noted that the known solutions may be discovered after the programming task ends (e.g., taking a set of solutions provided by different users, which were verified as functionally correct, such as using unit testing), and may not necessarily be known while the user is coding. In some exemplary embodiments, the repository may comprise one or more versions of correct programs that achieve the functional goal defined for the programming task. In some exemplary embodiments, cosine-similarity of the intermediate solution to the solutions in the repository. In some exemplary embodiments, the repository may include the most unique correct solutions. In some exemplary embodiments, the DPI may be the average distance from all solutions in the repository. Additionally or alternatively, the DPI may be the minimal distance from any of the solutions in the repository. Additionally or alternatively, the DPI may be based on the distances between the intermediate solution and the solutions in the repository, such as the minimal distance, the average distance, the variance of the distances, or the like. Distance may be measured using any distance measurement, such as but not limited to textual similarity, syntactical similarity, contextual similarity, or the like. It is noted that the DPI may indicate whether the solution is getting "closer" to a correct solution over time or not.

In some exemplary embodiments, DPI may be defined as a measurement of the shortest distance from the current code state to all other solutions for the same or similar coding challenge in our database. The distance d between two solutions may be defined as the cosine similarity of their embedded representation. In some exemplary embodiments, for 2 solutions t and e the distance therebetween can be computed as follows:

$$\cos(t, e) = \frac{te}{\|t\|\|e\|} = \frac{\sum_{i=1}^{n} t_i e_i}{\sqrt{\sum_{i=1}^{n} (t_i)^2} \sqrt{\sum_{i=1}^{n} (e_i)^2}}.$$

The DPI at time segment n may be computed as DPI[n]=min ($\forall s \in S$, d(CodeState[n], s), where S is the solutions repository, and CodeState[n] is the state of the intermediate solution at time segment n.

Figure 4A:
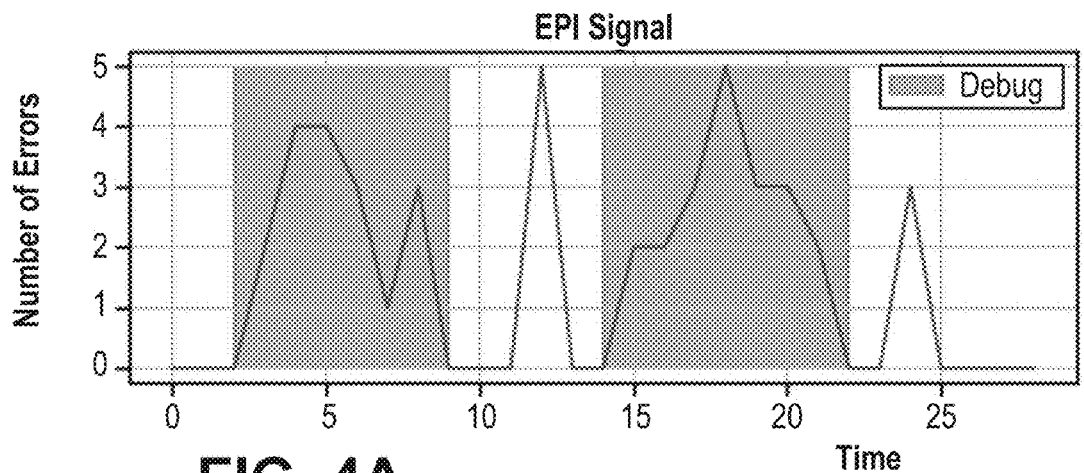
FIGS. 4A-4D illustrate signals and charts, in accordance with some exemplary embodiments of the disclosed subject matter.
Figure 4B:
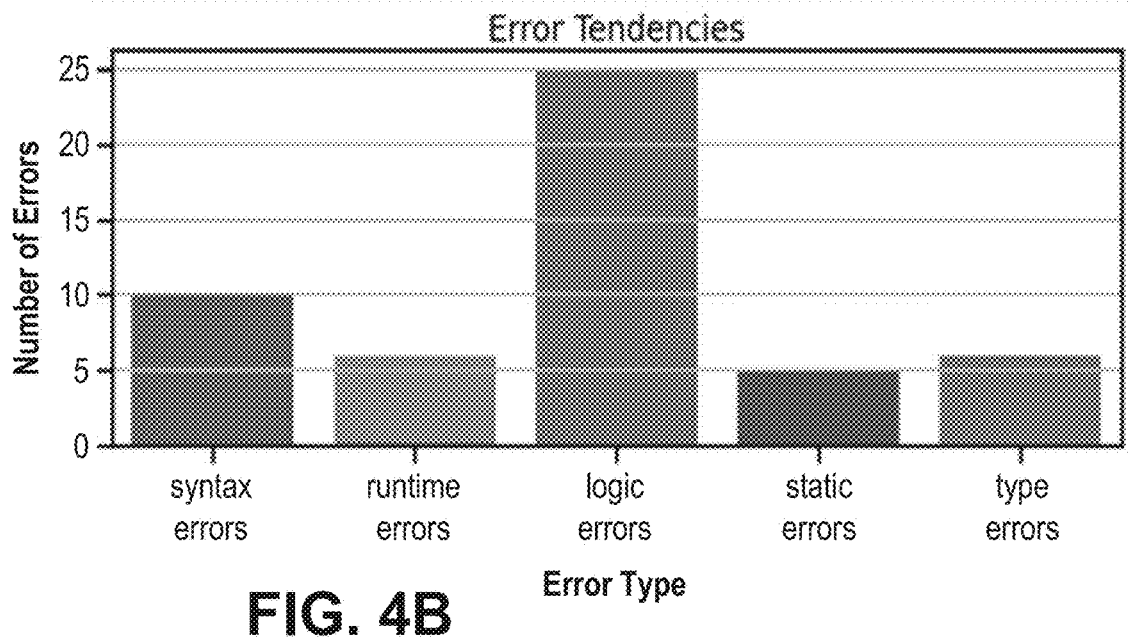

Error Per Increment (EPI): a measurement indicating an amount of errors in the code at the time segment. In some exemplary embodiments, the amount of errors may include amount of syntax errors. Additionally or alternatively, the amount of errors may include runtime errors. Additionally or alternatively, the amount of errors may be functional errors, such as number of unit tests that fail. EPI Signal is illustrated in FIG. 4A. As can be appreciated from FIG. 4A, EPI may be utilized to derive the number of debug sessions. For example, a debug session may be identified as a set of two or more consecutive time segments in which the number of compilation errors are more than zero. Additionally or alternatively, debug session may be identified based on a reduction of the value of EPI over two or more consecutive time segments, even if the first and/or last time segment does not necessarily have a zero value. For example, the user may solve a set of problems during a debug session, and may not resolve all errors, which may remain stable or increase as the user continues to perform the programming task.

Figure 4C:
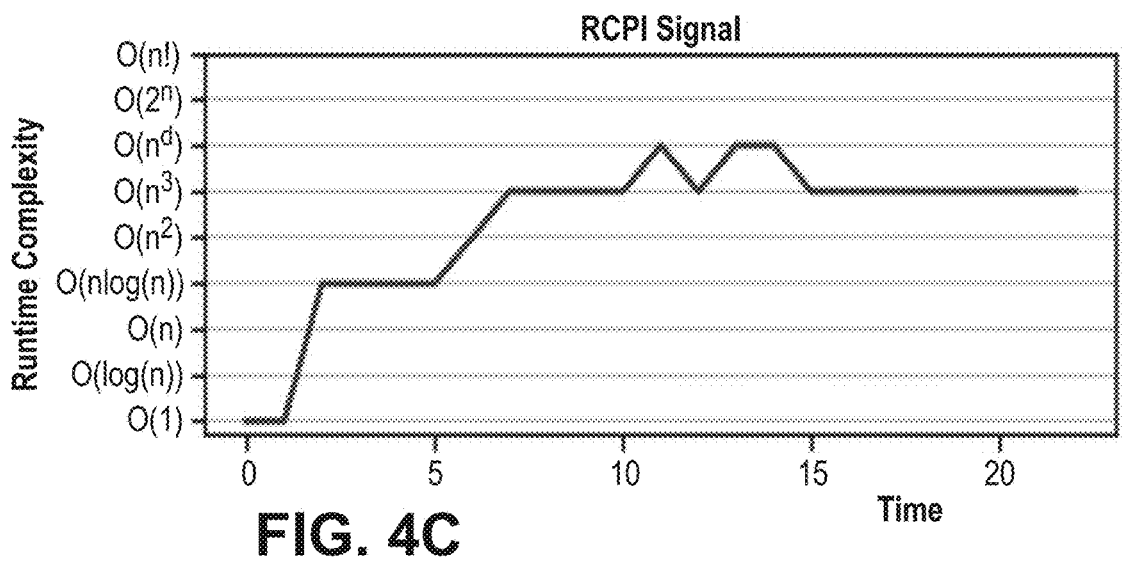

Runtime Complexity Per Increment (RCPI): a measurement indicating the code's estimated runtime complexity in the relevant time segment. In some exemplary embodiments, different techniques may be employed to estimate the runtime complexity of the intermediate solution, which may not even be compileable, let alone executable. In some exemplary embodiments, a machine learning model may be utilized and trained to provide the estimated runtime complexity of an intermediate solution. In some exemplary embodiments, RCPI at time segment n may be computed as RCPI[n]=ml(CodeState[n]), where CodeState[n] is the state of the intermediate solution at time segment n, and ml is a machine learning model configured to estimate runtime complexity for a given code. In some exemplary embodiments, analyzing the RCPI signal enables to dive into the pattern in which a challenge is being solved. In some exemplary embodiments, the RCPI signal may unlocks another window to look through at the process that led the user to his end solution. RCPI signal is illustrated in FIG. 4C, in which it can be shown that the user quickly reached a runtime complexity of $O(n \log(n))$. is After which, the complexity was increased to $O(n^3)$. During some minor segments, the complexity was even increased to $O(n^d)$, but the user quickly improved the complexity and returned the solution to have runtime complexity of $O(n^3)$. It is noted that a similar signal may be utilized for memory complexity or any other type of complexity metric of the program.

Figure 4D:
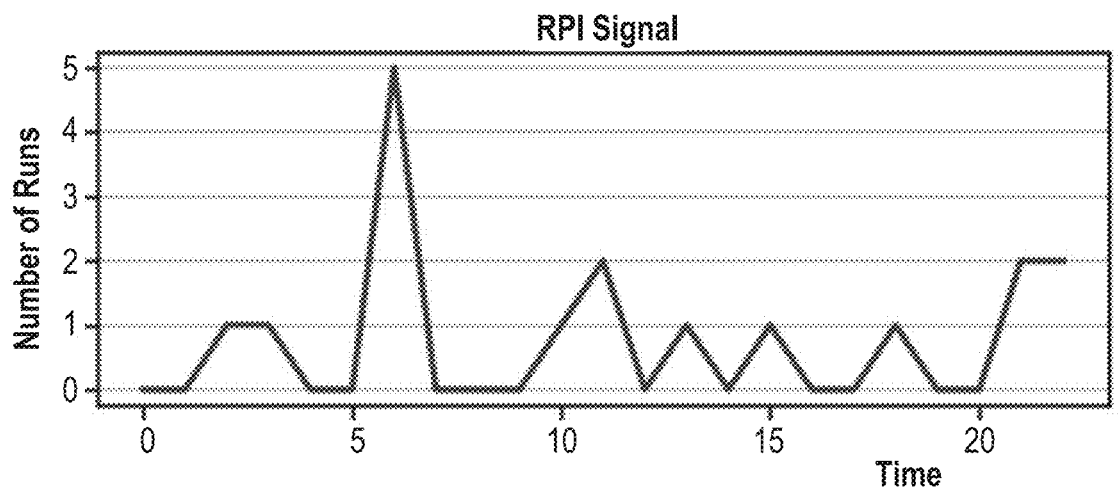

Runs Per Increment (RPI): a measurement indicating the number of the times the user has executed or attempted to execute the solution during a time segment. In some exemplary embodiments, RPI may be the number of times the user has clicked on the "run" button in IDE 110. It is noted that in some cases, clicking the "run" time may also re-compile the solution. Additionally or alternatively, RPI may measure the amount of compilation attempts and not execution attempts. It is noted that based on RPI's signal, attributes like patience or uncertainty can be derived. In some exemplary embodiments, it may be hypothesized that a user that very frequently runs his code to see if it runs and what is the output shows higher uncertainty and in periods of very intense picks those that surpass the actual time it takes for the platform to return a result points out to frustration and low patience. An example of an RPI signal over time is shown in FIG. 4D. As can be appreciated there are time segments in which the user is executing the program many times, while in others the user is not executing it at all or executing no more than once.

In some exemplary embodiments. Monitor 120 may be configured to monitor each different signal at each time segment (e.g., at each τ time interval). The monitoring may commence the moment a user first opens a given coding challenge and up until they submitted it.

In some exemplary embodiments, information may be extracted from Code Repository 130, such as GitHub™, GitLab™, VCC™, or the like. Users may link their code repository accounts, enabling the extraction of relevant information therefrom. In some cases, the code being developed using IDE 110 may be retained on the Code Repository 130 and the user's account on such platform may be required. In some exemplary embodiments, a code writing profile of the user may be generated based on the user's activity on Code Repository 130. In some exemplary embodiments, the profile may be based on repositories that were created by the user, based on commits made by is the user, or the like.

In some cases, anti-fraud measures may be employed. Suspect repositories or commits may be disregarded. For example, if a repository has a low proportion of number of commits with respect to its scale (e.g., 1 or 2 commits for a massive scale repository), it may be disregarded as potential fraud. Additionally or alternatively, repositories may be analyzed for plagiarism to identify potential fraud. For example, a fraud repository may be a file-to-file copy of a collection of well-known top-repositories.

In some exemplary embodiments, the information that is extracted from Code Repository 130 may include, for example, number of commits by the user, number of repositories owned by the user, number of stars on repositories or projects that belong to the user, number of issues on repositories maintained by the user, repositories' names, repositories' descriptions, repositories' code, involvement in open source projects, or the like. In some cases, the code itself may be utilized to identify what skills the user exhibits in these projects (e.g., security related issues, parallel code, embedded code, machine learning, specific coding languages, or the like). Additionally or alternatively, the information may be utilized to better understand the profile of the user.

In some exemplary embodiments, information may be extracted from Social Network 140, such as Facebook™, LinkedIn™, or the like. Additionally or alternatively, information regarding the user may be obtained from a CV of the user, which may be displayed in Social Network 140, explicitly or implicitly. In some exemplary embodiments, information about user's declared area of specialization, as well as the user's self-described abilities and skills may be obtained. In some exemplary embodiments, the information may include, e.g., years of experience, number of positions, education, skills, profile picture, employment time series, endorsements and recommendations, demographic information (e.g., age, sex, gender, city, language), or the like.

It is noted that in some cases, the user may provide duplicative bios, different bios, or the like, such as in LinkedIn™ and a different representation on the user's "about me section" in Online Forums 150, such as StackOverflow™. The different representation may be gathered and utilized. For example, differences may be extracted and utilized. Additionally or alternatively, identical elements may be considered of higher degree of confidence.

There may be Online Forums 150 that are coding-related. For example, StackOverflow™ is a known tool for developers to ask questions from colleagues and share knowledge. Information from such Online Forums 150 may also be obtained and utilized. In some exemplary embodiments, upvotes, downvotes, like reactions, accept rate, or similar feedback of specific answers provided by the user may be counted to determine proficiency. In some cases, the proficiency may be overall, while in other it may be per technology area. Additionally or alternatively, the content of the user's answers and questions may be gathered. The content may include code, showing how well the user codes or addresses specific issues. Additionally or alternatively, the content may indicate to which technology area each question or answer relates. In some cases, the Online Forum 150 may provide a platform-based proficiency metric (e.g., reputation metric in StackOverflow™), which may be obtained and utilized as well.

In some exemplary embodiments, Analysis Engine 160 may obtain various information from Monitor 120, Code Repository 130, Social Network 140, Online Forums 150, or the like, and generate an automated assessment. The automated assessment may be implemented using a prediction model which may utilize a set of feature vectors determined based on the data obtained from the different sources.

In some exemplary embodiments, the features may include features that are derived from the signals monitored by Monitor 120.

In some exemplary embodiments, logic stability feature may be derived from the LPI value. The logic stability may be indicative of whether significant changes are made in the coded program. As an example, logic stability may be computed based on a complexity-invariant distance of the LPI signal: $\sqrt{\Sigma_{i=2}^{n}(LPI_i - LPI_{i-1})^2}$. In some exemplary embodiments, the complexity-invariant distance may indicate whether the LPI has more peaks, valleys, and overall variation, indicating that the overall structure of the code has gone through potentially significant changes over and over again throughout the solution process. Different programmer may code differently and such observation of whether the developer continues to work in a generally stable or unstable logic flow may be relevant to assess the developer's performance. In some exemplary embodiments, the is value of the logic stability feature may be is bound by the interval [0, ∞].The higher the value, the more complex and less stable the logic was. The values may be mapped to the scale of [0,1], such as by applying logit function with a hyperparameter λ. In some exemplary embodiments, the hyperparameter may indicate the decay rate.

In some exemplary embodiments, a distribution of error type feature may be computed and utilized by Analysis Engine 160. In some exemplary embodiments, during the monitoring of the EPI signal, a distribution based on the types of errors the user is receiving may be formulated. In some exemplary embodiments, a number of errors of different types, such as syntax errors, runtime errors, logic errors, static errors, type errors, or the like, may be calculated. In some exemplary embodiments, the distribution per solved challenge may be aggregated into a large one representing the overall error tendencies of a user. In some exemplary embodiments, error tendencies in the initial thinking phase of the development process may be individually computed and utilized. Additionally or alternatively, the error tendencies in the final debugging phase of the development process may be individually computed and utilized. Additionally or alternatively, the error tendencies in the core development process, such as excluding the initial thinking phase and the final debugging phase, may be computed and utilized. In some exemplary embodiments, the distribution may be used to provide insight to the user herself on what type of error she is most prone to. Additionally or alternatively, the insight may be provided to an administrator or the user in charge of the assessment process. Additionally or alternatively, the distribution may be utilized to perform the automated assessment as an additional feature in the feature vector.

In some exemplary embodiments, a writing confidence feature may be computed. In some exemplary embodiments, the writing confidence feature may track variance in a rate of programming performed by the user. The writing confidence feature may be computed based on the complexity-invariant distance of the CPI signal. In some exemplary embodiments, the more the user is confident in her solution the smoother the CPI signal will be during the programming sections. In some cases, time segments during which the user did not code at all may be omitted. Additionally or alternatively, the CPI signal may be split into sections of continuous development in between non-focused time segments or non-developing time segments. An average, minimal, maximal, variance or the like on the different complexity-invariant distances of the different CPI signals in the different sections may be computed and utilized.

In some exemplary embodiments, a repetitiveness feature may be computed and utilized by Analysis Engine 160. In some exemplary embodiments, repetitiveness feature may be a measure of how repetitive is a user's behavior over the numerous challenges she solves. In some exemplary embodiments, repetitiveness may be derived by calculating a seasonality factor of each signal per challenge. For example, let $S=\{C_1, C_2, \ldots, C_n\}$ be a set of n solved challenged by user U where $C_i$ is the i-th solved challenge. For each solved challenge $C_i$ there may be a set of time-series signals (e.g., $CPL_i$, $FPI_i$, $LPI_i$, $DPI_i$, $EPI_i$, $RCPI_i$, $RPI_i$, or the like). In some exemplary embodiments, the seasonality factor for each one of those signals may be derived by solving the following equation while minimizing the error: [Y]=One of the signals, [t]=a time point on the signals period, [S]=Seasonality (cyclic pattern occurring at regular intervals), [T]=Trend (general tendency to move up or down),[e]=Residual. Solve for: $Y[t]=S[y]+T[t]+e[t]$. In some exemplary embodiments, the overall repetitiveness may be the average, mean, common or the like of the distances between all signals [T] (trends) of all the solutions. In some exemplary embodiments, the distance between all [T] (trends) for all signals may be calculated and the set of averages of each signal may represent the variability in the trend of the signals across all solutions. In some exemplary embodiments, the average of those values may be the repetitiveness feature. In some exemplary embodiments, the higher the repetitiveness value is the less repetitive is a user, meaning she is more unique/unstable in the way she approaches challenges and there is no constant solution/typing/error pattern she keeps repeating when addressing new challenges.

In some exemplary embodiments, a feature representing uniqueness of thinking may be computed. In some exemplary embodiments, the Uniqueness of Thinking may be based on the complexity value of the DPI signal. In some exemplary embodiments, a more complex DPI signal may indicate that during the solution process, a developer is often getting close to an already existing solution in the repository and then suddenly dropping back to being unique. In some exemplary embodiments, given that the user is writing a unique solution through the entire solution process, the complexity of the DPI signal should be closer to 0.

In some exemplary embodiments, the uniqueness of thinking feature can also be useful in identifying plagiarism. In some exemplary embodiments, in a situation where the user is writing a copy of an already existing solution from start to finish, the DPI signal complexity may be low, but the average mean of the signal may be high as the average L2 distance throughout the solution process may be respectively high. Such indication may be useful to identifying plagiarism and other adverse attempts by the user to fool the assessment system.

In some exemplary embodiments, number of breakthroughs feature may be computed based on the time-series monitored data and utilized by Analysis Engine 160. In some exemplary embodiments, a Number of Breakthroughs feature may be computed based on the number of significant peaks following shallow regions of the CPI signal. In some exemplary embodiments, the CPI signal may be smoothed, such as using a wavelet for widths ranging from 1 to n, where n is the maximum width to consider. In some exemplary embodiments, Morelet wavelet, Gabor wavelet, Ricker wavelet, Hermitian wavelet, Beta wavelet, Fbsp wavelet, Shannon wavelet, or the like. The number of peaks that occur at enough width scales and with sufficiently high (e.g., above a threshold) Signal-to-Noise-Ratio (SNR) may be counted and represented as the Number of Breakthroughs. In some exemplary embodiments, the more the user gets stuck at different points at her solution process, dropping the CPI signal to values close to zero, than each time there is a rapid increment in the CPI value (e.g., represented by a peak), such an event can be interpreted as the user having a breakthrough after being stuck on a particular issue in her solution.

In some exemplary embodiments, thinking time feature may be computed based on the time-series monitored data and utilized by Analysis Engine 160. In some exemplary embodiments, thinking time may be computed as the number of sampling periods starting from t=0 that are equal to zero. Leveraging the fact that Monitor 120 monitors the user activity constantly on the platform enables the disclosed subject matter to derive precisely how many periods from the start of a challenge a user has spent processing the task description before actually starting to attempt to solve the challenge. It is noted that there may be many different writing patterns. In some cases, the initial time before the first typed characters may be considered of importance. In some cases, this can differentiate between two types of candidates: those who take their time and process the given challenge, create a plan of action and only then start actually to write code and on the other hand there those who immediately will engage in code writing and will require many additions and changes to make their code flow both working and readable. In some exemplary embodiments, the thinking time feature may represent the amount of time segments before the user has started developing, such as the number of consecutive time segments before the LPI reaches a minimal value for the first time, representing initial thinking time. Additionally or alternatively, number of thinking segments may be computed, such as by computing a number of consecutive time segments in which CPI is relatively low (e.g., below a threshold), in which LPI remains stable (e.g., remaining within a lower bound and upper bound), or the like. In some exemplary embodiments, a length of each thinking period, e.g., number of consecutive time segments it includes, may be computed. In some exemplary embodiments, an average, median, common, minimal, maximal, variance or other similar measurements may be computed with respect to the lengths of the thinking periods of each user to characterize the user's activity.

In some exemplary embodiments, estimated debugging time feature may be computed based on the time-series monitored data and utilized by Analysis Engine 160. In some exemplary embodiments, the estimated debugging time may be estimated based on the EPI signal, as is exemplified in FIG. 4A. Additionally or alternatively, final debugging period of the programming task may be identified. In some exemplary embodiments, the CPI signal may be scanned in a reverse manner (e.g., starting from the end of time series and scanning towards the beginning of the time series). In some exemplary embodiments, the final debugging period may be identified as commencing based on the value of the CPI signal. As an example, the stopping criteria for the scanning may be the first occurrence of a sample where the CPI value is higher than a factor of the standard deviations from the mean signal value, such as a factor of 1.5, a factor of 2, a factor of 3, or the like. Such point may be considered as the beginning of the final debugging period. In some exemplary embodiments, debugging time may be computed to indicate a number of debugging sessions, lengths of debugging sessions, average, mean, common, minimal or maximal durations of the debugging sessions, or the like.

In some exemplary embodiments, another methodology to extract a singular representation from the time-series data may be based on Mel-frequency cepstral coefficients (MFCCs). In some exemplary embodiments, all the signals may be concatenated into a signal multi-channel signal, where the signal length is the solution length, and that signal has multiple channel respectively to each time-series signal that was monitored by Monitor 120 or derived based on such monitored data. The multi-channel signal may be decomposed using Fourier transformation. In some exemplary embodiments, the furious coefficients may undergo processing procedure that outputs several coefficients that represent an encoding of the users behavior based on all signals. For example, 5 signals may be represented by 20 coefficients. Additionally or alternatively, 7 signals may be represented by 28 coefficients. Additionally or alternatively, 3 signals may be represented by 9 coefficients. In some exemplary embodiments, the coefficients may be used to aggregate users based on their behavior in a much quicker though less precise way to cluster and retrieve them based on their signals.

In some exemplary embodiments, Analysis Engine 160 may create a feature vector for the user based on a single user or a collection of journeys solved by the user. In some exemplary embodiments, a theme tagger model (not shown) may be utilized to tag user's code from Code Repository 130. In some exemplary embodiments, the tags may indicate which elements are mainly present in the user's code, such as for example, Databases, Algorithms, Logic, Mathematics, SQL, OOP, or the like.

In some exemplary embodiments, code-based features may be utilized and their value may be determined based on a single code example, based on a set of code samples aggregated together, a set of values of separate code samples, that are aggregated together such as by computing average, common, mean, or the like. In some exemplary embodiments, the code-based features of a user may be determined based on all of the user's solutions that were tracked. In some exemplary embodiments, user's code from external repositories may also be considered and analyzed. In some exemplary embodiments, the code-based features may comprise a number of comments feature, representing the number of comments written on average by the user in her code. Additionally or alternatively, the number of comments feature may represent a ratio between a number of lines of code and a number of lines of comments. In some exemplary embodiments, the code-based features may include an average number of code lines written by the user, an average comment length, an average number of functions, an average number of unique variables the user creates in her code, the average number of times unique variables are being used, the average amount of loops (e.g., for loops, while loops, list loops, or the like) the user uses, the average amount of conditions the user uses in her code, or the like.

It is noted that in some programming tasks there may be one or more prototypes of functions that the user needs to implement. The number of functions may disregard such functions as they are mandated by the programming task.

In some exemplary embodiments, additional prediction models may be trained and utilized to analyze the code and determine labels. For example, based on a manually labeled training dataset, a "best practice score" label may be estimated based on user's code. The label may indicate that the code utilizes best practice approaches in techniques as per programming language or platform utilized. As another example, cleverness label or score may be predicted using supervised-based learning model.

In some exemplary embodiments, Online Forums 150 answers may be analyzed to extract a context vector. In some exemplary embodiments, only an N top answers/questions of the user may be processed. The context vector may be extracted via a pre-trained transformer-based language model. In some exemplary embodiments, the context may embed the main parts of the answers, averaging all of those and using those as the "average answer context" as part of later-stage layers.

In some exemplary embodiments, the above mentioned feature maps may be concatenated into a singular representation and fed through an Artificial Neural Network (ANN). In some exemplary embodiments, the singular representation may be fed into a fully connected layer of the ANN where mapping is derived from that concatenated feature vector to a probability vector, where the value of each end neuron in the ANN is the probability that the user as the hand is proficient at that skill. Additionally or alternatively, the probability value may service as a scale, where a value of 1 means a "higher" score than a value of 0.8.

In some exemplary embodiments, an end validation may be taking all the skills above a threshold probability and comparing them to the self-reported skills. In some exemplary embodiments, the self-reporting skills may be indicative of actual skills, of additional skills, or the like. In some exemplary embodiments, the user's self-reporting skills may be verified or refuted.

In some exemplary embodiments, Output Device 170 may be configured to provide an output to the user and/or an admin user. In some exemplary embodiments, the user may receive output indicating how well she performed her programming task. Additionally or alternatively, Output Device 170 may indicate whether the solution is functionally correct, its computational complexity, or the like. In some exemplary embodiments, an admin user may receive information regarding users. For example, the admin may receive information about several candidates that were assessed. In some exemplary embodiments, a comparative view of alternative candidates may be displayed. In some exemplary embodiments, the admin user may be enabled to manually review the solution provided by each user, perform code review, review comments, or the like. In such a case, the automatic assessment may be a decision-supporting tool. Additionally or alternatively, the admin user may receive information about improvement of users in their educational journey. In some exemplary embodiments, the output may be provided via any form of display, including but not limited to a web-based Graphical User Interface (GUI), a desktop GUI, a native mobile app, or the like.

Figure 2A:
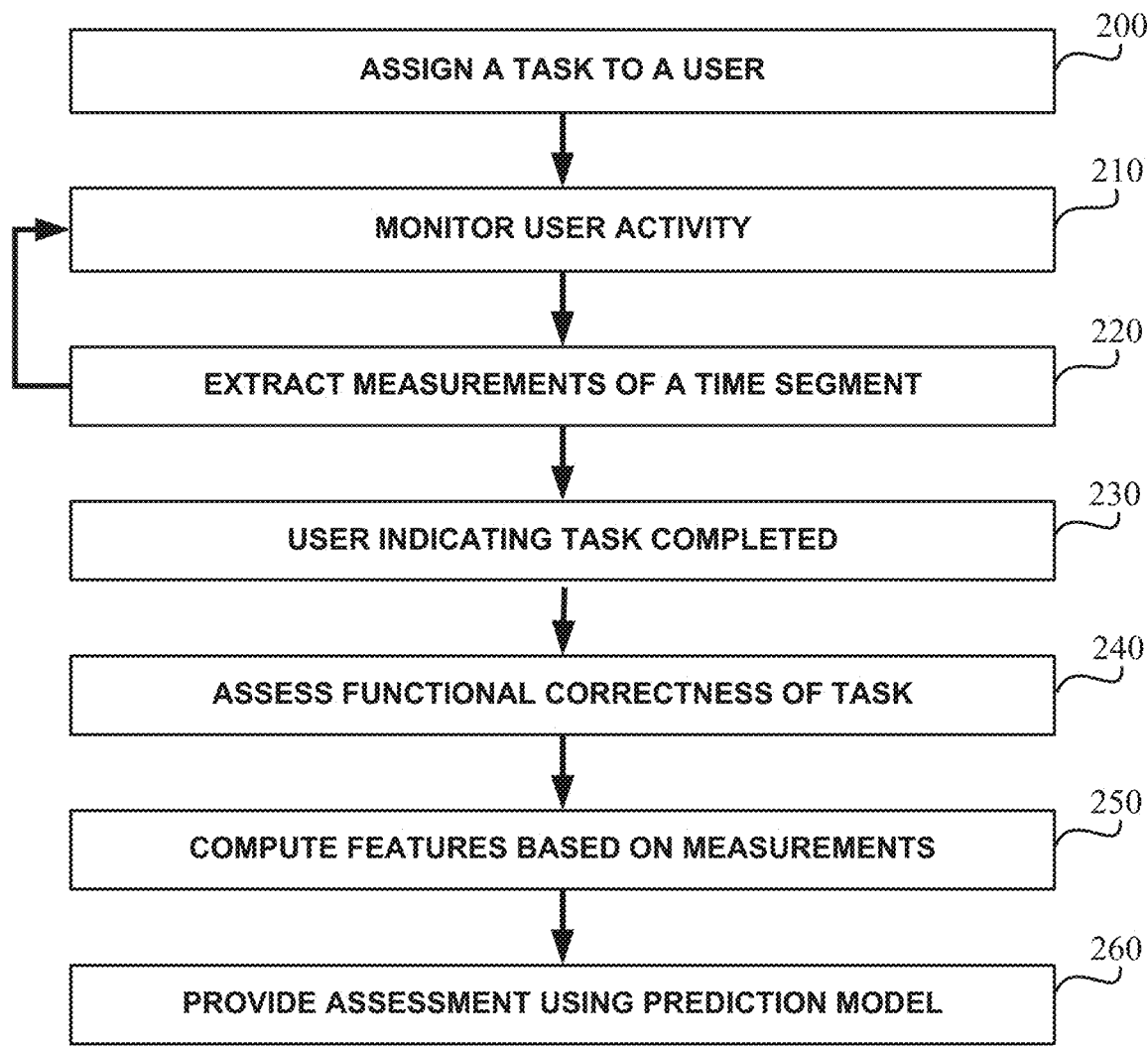
FIGS. 2A-2B show flowchart diagrams of methods, in accordance with some exemplary embodiments of the disclosed subject matter.

Referring now to FIG. 2A showing a flowchart diagram of a method, in accordance with some exemplary embodiments of the disclosed subject matter.

On Step 200, a task is assigned to a user. The task may be a programming task. In some exemplary embodiments, the task may be assigned as part of assessment of the user, such as during onboarding process, recruiting process, training process, or the like.

On Step 210, the user activity is monitored over time. In some exemplary embodiments, the user activity in an IDE, such as 110 of FIG. 1, may be monitored, such as using a monitor, such as 120 of FIG. 1. Monitoring may include identifying which application is in a foreground of the screen, which window has the functional focus, which tab is currently active, or the like. Monitoring may include tracking typing activities and counting typed characters. Monitoring may include obtaining a current version of the intermediate solution, such as for evaluation DPI, LPI, EPI, RCPI, or the like. In some exemplary embodiments, periodically, a measurement for a time segment may be extracted (220). Based on extracted measurements, a time-series data of different signals may be collected.

On Step 230, the user may indicate she has completed the task. In some exemplary embodiments, the user may submit her solution to be assessed.

On Step 240, the functional correctness of the solution may be assessed. In some exemplary embodiments, the functional correctness may be assessed by utilizing unit tests. In some exemplary embodiments, a plurality of unit tests may be provisioned together with the programming tasks. The unit tests may be executed to determine whether the solution is functionally correct. In some exemplary embodiments, if one unit test fails, the solution may be considered as functionally incorrect.

On Step 250, one or more features may be computed based on the time-series measurements obtained during Steps 210-220.

On Step 260, assessment may be determined using a prediction model. The prediction model may be a machine learning model, a deep learning model, or the like. In some exemplary embodiments, the assessment may be provisioned to the user herself, to an admin user, a combination thereof, or the like.

Figure 2B:
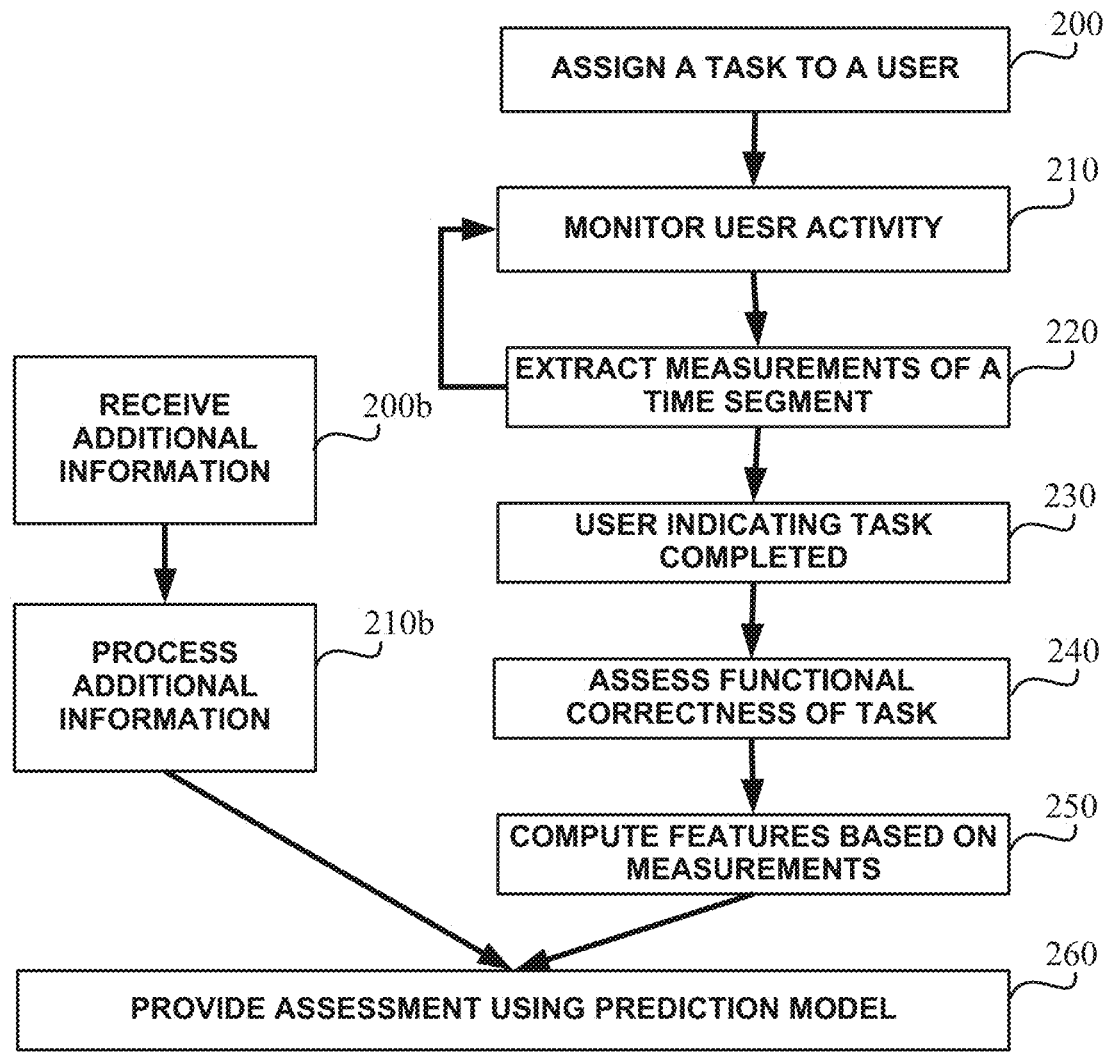

Referring now to FIG. 2B showing a flowchart diagram of a method, in accordance with some exemplary embodiments of the disclosed subject matter. FIG. 2B augments FIG. 2A by adding additional information. In some exemplary embodiments, additional information on top of the monitored information may be obtained (200b). Such information may include information regarding code repositories, user's CV, social network profile, activity on developers' forums, or the like. The additional information may be processed (210b), and utilized to provide the automated assessment on Step 260.

Figure 3A:
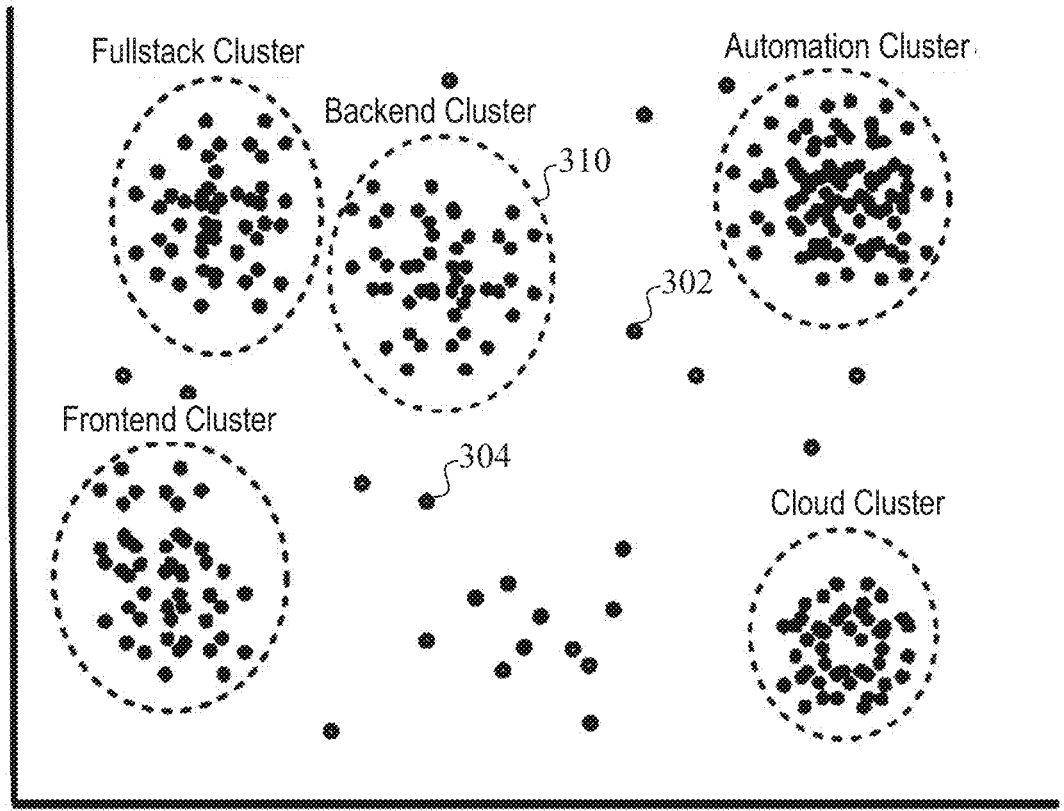
FIG. 3A shows an illustration of a developer domain chart, in accordance with some exemplary embodiments of the disclosed subject matter.

Referring now to FIG. 3A showing an illustration of a developer domain chart, in accordance with some exemplary embodiments of the disclosed subject matter.

In some exemplary embodiments, after a user solves the challenges assigned to her, or connects/provides the system with one or more of the additional resources mentioned above, a user feature vector may be constructed. As an example, the user feature vector may comprise IDE-derived features, GitHub-derived features, LinkedIn/CV-derived features, and StackOverflow-derived features. Such feature vector may be a representation of the profile of the user.

In some exemplary embodiments, given sufficient number of users that are assessed by the system, the disclosed subject matter may identify clusters of users with similar traits and characteristics. In some exemplary embodiments, the data may be useful to compute a "Developer Domain". The developer domain may hold latent information not just of each user "sequence" as an individual but of a wide phenomenon, leveraging the variety of both tech oriented skill sets and intrapersonal variables to form a natural cluster of users.

FIG. 3A exemplifies a projection of the developer domain in 2-dimensions, where each dot represents a different developer based on her feature vector. As can be appreciated, clusters of developers of different types—fullstack developers, backend developers, frontend developers, cloud developers, automation developers, or the like —may be identified. A new developer may be assessed as to her potential match to a specific role based on the distance from the relevant cluster.

In some exemplary embodiments, a journey of a developer starting from her initial location within the developer domain to a target cluster may be tracked. In some cases, the likelihood of a developer transitioning from a source location to a target location may be assessed. Additionally or alternatively, the time duration such a transition may take may be estimated. As an example, User 302 and User 304 may be at the same distance from Backend Cluster 310. However, based on past experience, it may be determined that User 302 is more likely to be able to transition into the Backend Cluster 310 than User 304.

In some exemplary embodiments, users of similar skill sets, work methodology and best practices may have similar representation in the developer domain. In some exemplary embodiments, such a domain is leveraged by the disclosed subject matter to learn and adapt to different specializations depending on the client needs. In some exemplary embodiments, the developer domain can be used to classify and recommend a candidate or a participant in a boot camp to the best fitting specialization based on their feature vector. In some exemplary embodiments, a distance between a new unlabeled user to each of the cluster centroids may be used as a metric of fitness to that position.

As an example, the following may be computed. In some exemplary embodiments, a fitness of a user represented by U to the j-th category, the centroid of the relevant cluster is $C_i$, may be computed as $$\text{fitness}(U, j) = \sqrt{\frac{1}{n}\sum_{i=1}^{n}(U[j] - C_i[j])^2}.$$

Figure 3B:
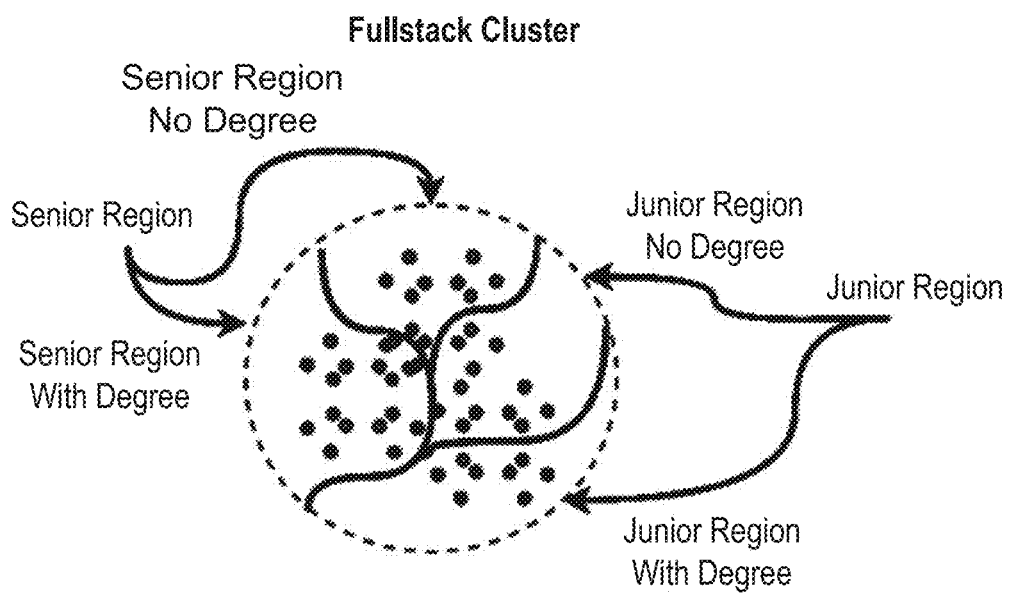
FIG. 3B shows an illustration of a single cluster within the developer domain chart, in accordance with some exemplary embodiments of the disclosed subject matter.

It is noted that a specialization cluster may also be divided to specific sub-categorized, such as users with more experience or specific skill set. As another example, seniority or juniority of a user may be identified based on the user's location within the cluster. Using information on specific users within the cluster, sub-profiles of each specialization may be identified. FIG. 3B shows an illustration of a single cluster within the developer domain chart, showing potential sub-profiles within such cluster. FIG. 3B illustrates a junior region for fullstack developers and a senior region. Each such region is also divided to developers with an academic degree and developers that do not have such a degree. In some cases, the internal division may be based on skill sets, capabilities, or the like.

Figure 5:
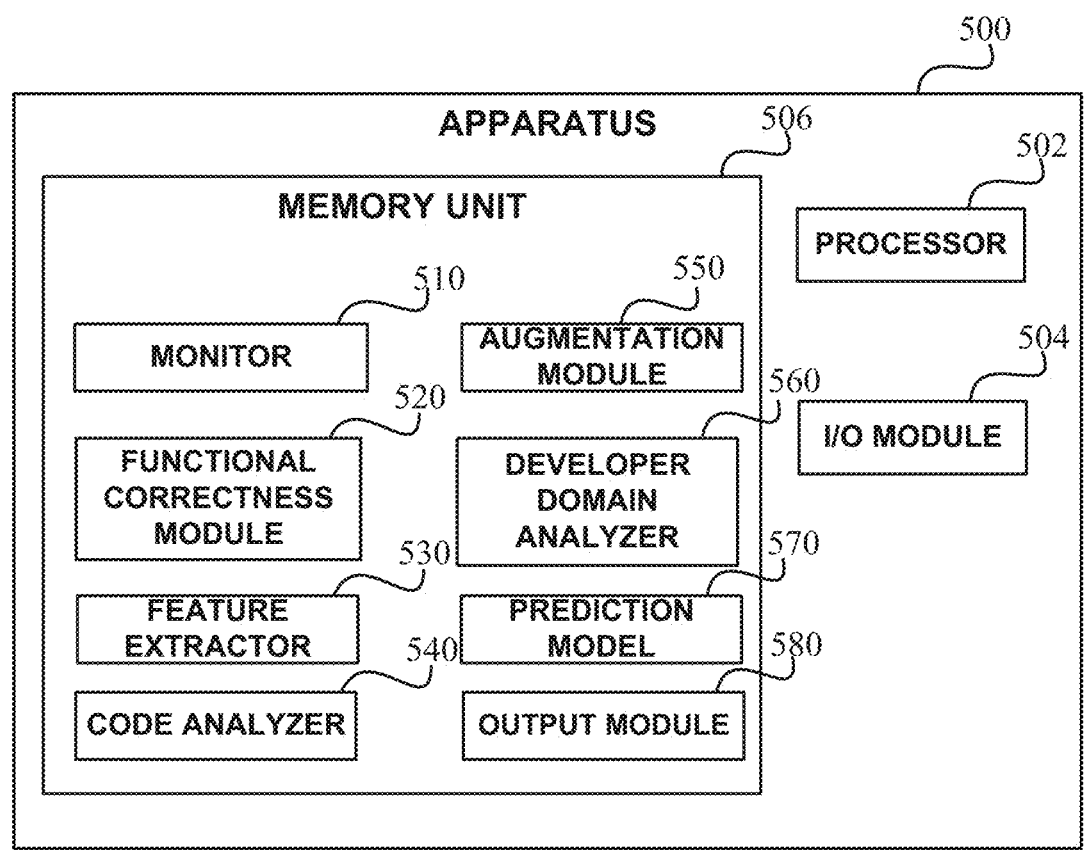
FIG. 5 shows a block diagram of an apparatus, in accordance with some exemplary embodiments of the disclosed subject matter.

Referring now to FIG. 5 shows a block diagram of an apparatus, in accordance with some exemplary embodiments of the disclosed subject matter.

In some exemplary embodiments, Apparatus 500 may comprise one or more Processor(s) 502, an Input/Output (I/O) Module 504, a Memory Unit 506, or the like.

In some exemplary embodiments, Processor 502 may be a Central Processing Unit (CPU), a Graphical Processing Unit (GPU), a microprocessor, an electronic circuit, an Integrated Circuit (IC) or the like. Processor 502 may be utilized to perform computations required by Apparatus 500 or any of its subcomponents.

In some exemplary embodiments, Apparatus 500 may comprise an Input/Output (I/O) Module 504. I/O Module 504 may be utilized to communicate with other computerized devices. Additionally or alternatively, I/O Module 504 may be utilized to provide output to users.

In some exemplary embodiments, Apparatus 500 may comprise Memory Unit 506. Memory Unit 506 may be a hard disk drive, a Flash disk, a Random Access Memory (RAM), a memory chip, or the like. In some exemplary embodiments, Memory Unit 506 may retain program code operative to cause Processor 502 to perform acts associated with any of the subcomponents of Apparatus 500.

Memory Unit 506 may be utilized to retain an Application 1205 or access thereto, which may comprise a native mobile application, a website, a dedicated web application, a hybrid application, a generic mobile application, or the like.

Memory Unit 506 may be utilized to retain a Walkthrough Layer 1215. In some exemplary embodiments, Walkthrough Layer 1215 may comprise a software layer, a computer program, a computing block, or the like, configured to provide one or more walkthroughs to Application 1205. In some exemplary embodiments, Walkthrough Layer 1215 may retain a repository of walkthroughs associated with functionalities of applications.

Memory Unit 506 may be utilized to retain Monitor 510, such as 110 of FIG. 1.

Memory Unit 506 may be utilized to retain Functional Correctness Module 520. Functional Correctness Module 520 may be configured to assess functional correctness of a solution. In some exemplary embodiments, Functional Correctness Module 520 may execute unit tests of a programming task to assess functional correctness. In some cases, if the solution is determined to be correct, the solution may be added to a solution repository (not shown). In some exemplary embodiments, the solution may be added to the repository if there are solutions that are similar thereto, e.g., if the minimal similarity measurement between the current solution and each existing known solution is above a threshold.

Memory Unit 506 may be utilized to retain Feature Extractor 530. Feature Extractor 530 may be configured to compute values of features based on time-series data provided by Monitor 510. Additionally or alternatively, Feature Extractor 530 may utilize additional information, such as provisioned by Augmentation Module 550, to compute features. Augmentation Module 550 may be configured to augment the information is available to the system from external sources, such as social networks, CVs, online forums, code repositories, or the like.

Memory Unit 506 may be utilized to retain Code Analyzer 540. Code Analyzer 540 may be configured to analyze the code to determine properties based thereon, such as number of lines of code, number of lines of comments, computational complexity, cleverness, best practice score, or the like. Code Analyzer 540 may detect coding language, utilized APIs and artifacts, so as to enable domain-specific tagging based on the content of the code. Code Analyzer 540 may be configured to analyze the code using machine learning models, using deep learning models, or the like. Code Analyzer 540 may analyze the code provisioned by the user as a solution to a programming task. Additionally or alternatively, Code Analyzer 540 may analyze code associated with the user retained in external repositories. In some exemplary embodiments, Code Analyzer 540 may be configured to detect potential fraud attempt, plagiarism attempt, or the like.

Memory Unit 506 may be utilized to retain Developer Domain Analyzer 560. In some exemplary embodiments, Developer Domain Analyzer 560 may be configured to analyze the developer domain, such as illustrated in FIGS. 3A-3B. Developer Domain Analyzer 560 may determine the location of the user in the developer domain, her relevant clusters, her likelihood of reaching a target cluster/target sub-area within a cluster, an estimated training time until the user would reach the target cluster/target sub-area within a cluster, or the like.

Memory Unit 506 may be utilized to retain Prediction Model 570. Prediction Model 570 may be utilized in the automated assessment of the user. In some exemplary embodiments, Prediction Model 570 may be fed feature vector generated by Feature Extractor 530, representing the user's single solution, the user's several solutions to several programming tasks, or the like.

Memory Unit 506 may be utilized to retain Output Module 580. Output Module 580 may be configured to provide output to users, such as the user been assessed, an admin user, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not is preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. A method comprising:
automatically monitoring an activity of a developer in an Integrated Development Environment (IDE), said automatically monitoring is performed while the developer is programming a program via the IDE, wherein the developer is a candidate for recruitment to an organization, the developer is being evaluated by the organization, wherein the developer performs a programming task for recruitment evaluation, wherein the programming task has one or more known solutions;
wherein said monitoring comprises periodically obtaining measurements of a plurality of metrics in time intervals having a predetermined time duration, whereby obtaining the measurements in a plurality of time segments, the predetermined time duration is no longer than one hour, wherein the plurality of metrics comprises at least:
  a Characters Per Increment (CPI) metric indicating a number of characters written by the developer during a respective time segment;
  a Length Per Increment (LPI) metric indicating a length of the program at an end of the respective time segment;
  a Focus Per Increment (FPI) metric indicating whether during the respective time segment, the developer was in the IDE or had left the IDE;
  a Runs Per Increment (RPI) metric indicating a number of times the developer had attempted to execute the program during the respective time segment; and
  a Distance Per Increment (DPI) metric indicating a similarity measurement between the program at the end of the respective time segment and the one or more known solutions;
automatically determining a functional correctness of the program at a last time segment of the plurality of time segments;
computing values of a plurality of features based on the measurements of each of the metrics in the plurality of time segments, the plurality of features are indicative of a behavior of the developer while programming, the plurality of features comprise at least:
  a feature indicating logic stability of the program over the plurality of time segments, wherein the feature indicating logic stability is computed based on a complexity-invariant distance of values of the LPI metric;
  a feature indicating debugging time performed by the developer. wherein the feature indicating debugging time is computed based on values of the CPI metric:
  a feature indicating a variance in a rate of programming performed by the developer over the plurality of time segments. wherein the feature indicating the variance in the rate of programming is computed based on the complexity-invariant distance of values of the CPI metric; and
  a feature indicating a thinking time duration taken by the developer to plan how to develop the program, wherein the feature indicating the thinking time duration is based on at least one of LPI metric and CPI metric; and
utilizing a prediction model to provide an automated assessment based on the values of the plurality of features, whereby providing the organization with an assessment of the developer to assist in the determination of whether to recruit the developer.

2. The method of claim 1, wherein the prediction model is further configured to provide the automated assessment based on one or more features derived based on a self-reported profile of the developer obtained from one or more social networks.

3. The method of claim 1, wherein the prediction model is further configured to provide the automated assessment based on one or more features derived from activity of the developer as reflected on a code repository.

4. The method of claim 3, wherein the code repository comprises a version 6. control functionality, wherein at least one feature is derived based on code commits performed by the developer.

5. The method of claim 1, wherein said automatically determining the functional correctness of the program comprises: executing a plurality of unit tests, wherein in response to successful execution of each of the plurality of unit tests, the functional correctness of the program is determined.

6. The method of claim 1, wherein said automatically monitoring is performed by a monitoring module that is executed by the Integrated Development Environment (IDE).

7. The method of claim 1, wherein the prediction model is implemented using at least one of a machine learning model and a deep learning model.

8. A system comprising:
a processor and a memory,
wherein said system is configured to obtain by a monitoring module measurements of a plurality of metrics in a plurality of time segments, the monitoring module is configured to automatically monitor an activity of a developer in an Integrated Development Environment (IDE) while the developer is programming a program via the IDE, wherein the developer is a candidate for recruitment to an organization, the developer is being evaluated by the organization, wherein the developer performs a programming task for recruitment evaluation, wherein the programming task has one or more known solutions, the monitoring module is configured to periodically obtain measurements in time intervals having a predetermined time duration, thereby defining a time-series, the predetermined time duration is no longer than one hour, wherein the plurality of metrics comprises at least:
  a Characters Per Increment (CPI) metric indicating a number of characters written by the developer during a respective time segment;
  a Length Per Increment (LPI) metric indicating a length of the program at an end of the respective time segment;
  a Focus Per Increment (FPI) metric indicating whether during the respective time segment, the developer was in the IDE or had left the IDE;
  a Runs Per Increment (RPI) metric indicating a number of times the developer had attempted to execute the program during the respective time segment; and
  a Distance Per Increment (DPI) metric indicating a similarity measurement between the program at the end of the respective time segment and the one or more known solutions;
wherein said system is configured to validate, using a functional correctness module, a functional correctness of the program at a last time segment of the plurality of time segments;
wherein said processor is configured to:
compute values of a plurality of features based on the measurements of each of the metrics in the plurality of time segments, the plurality of features are indicative of a behavior of the developer while programming, the plurality of features comprise at least:
  a feature indicating logic stability of the program over the plurality of time segments, wherein the feature indicating logic stability is computed based on a complexity-invariant distance of values of the LPI metric;
  a feature indicating debugging time performed by the developer. wherein the feature indicating debugging time is computed based on values of the CPI metric:
  a feature indicating a variance in a rate of programming performed by the developer over the plurality of time segments, wherein the feature indicating the variance in the rate of programming is computed based on the complexity-invariant distance of values of the CPI metric; and a feature indicating a thinking time duration taken by the developer to plan how to develop the program, wherein the feature indicating the thinking time duration is based on at least one of LPI metric and CPI metric; and utilize a prediction model to provide an automated assessment based on the values of the plurality of features, whereby providing the organization with an assessment of the developer to assist in the determination of whether to recruit the developer.

9. The system of claim 8, wherein the prediction model is further configured to provide the automated assessment based on one or more features derived based on a self-reported profile of the developer obtained from one or more social networks.

10. The system of claim 8, wherein the prediction model is further configured to provide the automated assessment based on one or more features derived from activity of the developer as reflected on a code repository.

11. The system of claim 10, wherein the code repository comprises a version control functionality, wherein at least one feature is derived based on code commits performed by the developer using the version control functionality.

12. A non-transitory computer readable medium retaining program instructions, which program instructions when read by a processor, cause the processor to perform:

automatically monitoring an activity of a developer in an Integrated Development Environment (IDE), said automatically monitoring is performed while the developer is programming a program via the IDE, wherein the developer is a candidate for recruitment to an organization, the developer is being evaluated by the organization, wherein the developer performs a programming task for recruitment evaluation, wherein the programming task has one or more known solutions, wherein said monitoring comprises periodically obtaining measurements of a plurality of metrics in time intervals having a predetermined time duration, whereby obtaining the measurements in a plurality of time segments, the predetermined time duration is no longer than one hour, wherein the plurality of metrics comprises at least:

a Characters Per Increment (CPI) metric indicating a number of characters written by the developer during a respective time segment;

a Length Per Increment (LPI) metric indicating a length of the program at an end of the respective time segment;

a Focus Per Increment (FPI) metric indicating whether during the respective time segment, the developer was in the IDE or had left the IDE;

a Runs Per Increment (RPI) metric indicating a number of times the developer had attempted to execute the program during the respective time segment; and a Distance Per Increment (DPI) metric indicating a similarity measurement between the program at the end of the respective time segment and the one or more known solutions;

automatically determining a functional correctness of the program at a last time segment of the plurality of time segments;

computing values of a plurality of features based on the measurements of each of the metrics in the plurality of time segments, the plurality of features are indicative of a behavior of the developer while programming the plurality of features comprise at least:

a feature indicating logic stability of the program over the plurality of time segments, wherein the feature indicating logic stability is computed based on a complexity-invariant distance of values of the LPI metric;

a feature indicating debugging time performed by the developer, wherein the feature indicating debugging time is computed based on values of the CPI metric;

a feature indicating a variance in a rate of programming performed by the developer over the plurality of time segments. wherein the feature indicating the variance in the rate of programming is computed based on the complexity-invariant distance of values of the CPI metric; and a feature indicating a thinking time duration taken by the developer to plan how to develop the program, wherein the feature indicating the thinking time duration is based on at least one of LPI metric and CPI metric; and utilizing a prediction model to provide an automated assessment based on the values of the plurality of features, whereby providing the organization with an assessment of the developer to assist in the determination of whether to recruit the developer.

13. The non-transitory computer readable medium of claim 12, wherein the prediction model is further configured to provide the automated assessment based on one or more features derived based on a self-reported profile of the developer obtained from one or more social networks.

14. The non-transitory computer readable medium of claim 12, wherein the prediction model is further configured to provide the automated assessment based on one or more features derived from activity of the developer as reflected on a code repository.

* * * * *